United States Patent
Chung et al.

(10) Patent No.: US 11,898,262 B2
(45) Date of Patent: Feb. 13, 2024

(54) NICKEL-PLATED STAINLESS STEEL SHEET HAVING EXCELLENT PROCESSABILITY AND MANUFACTURING METHOD THEREOF

(71) Applicant: TCC Steel Corp., Gyeongsangbuk-do (KR)

(72) Inventors: Jin Hwan Chung, Gyeongsangbuk-do (KR); Tae Woo Kwon, Gyeongsangbuk-do (KR); Hyun Jun Baek, Gyeongsangbuk-do (KR); Yoon Han Kim, Gyeongsangbuk-do (KR); Jun Mo Jeon, Gyeongsangbuk-do (KR)

(73) Assignee: TCC Steel Corp., Gyeongsangbuk-Do (KR)

( * ) Notice: Subject to any disclaimer, the term of this patent is extended or adjusted under 35 U.S.C. 154(b) by 0 days.

(21) Appl. No.: 17/410,785

(22) Filed: Aug. 24, 2021

(65) Prior Publication Data
US 2022/0372644 A1    Nov. 24, 2022

(30) Foreign Application Priority Data
May 20, 2021    (KR) .......................... 10-2021-0064954

(51) Int. Cl.
*B32B 15/01* (2006.01)
*C25D 3/12* (2006.01)
*C25D 7/06* (2006.01)

(52) U.S. Cl.
CPC .............. *C25D 3/12* (2013.01); *C25D 7/0692* (2013.01); *B32B 15/015* (2013.01)

(58) Field of Classification Search
CPC ..................................................... B32B 15/015

USPC .......................................................... 428/681
See application file for complete search history.

(56) References Cited

U.S. PATENT DOCUMENTS

2016/0211489 A1    7/2016    Yoshioka et al.

FOREIGN PATENT DOCUMENTS

| CN | 106521587 A | 3/2017 | |
|---|---|---|---|
| EP | 3385412 A1 | 10/2018 | |
| EP | 3767699 A1 | 1/2021 | |
| JP | 03287795 A | * 12/1991 | |
| JP | 2000282290 A | * 10/2000 | |
| JP | 2001279490 A | 10/2001 | |
| JP | 2003245713 A | * 9/2003 | ............ F28F 21/083 |
| JP | 2004149863 A | * 5/2004 | |
| JP | 3594286 B2 | 11/2004 | |

(Continued)

OTHER PUBLICATIONS

Sugikawa, JPH03287795A machine translation printed on Sep. 22, 2022, Dec. 18, 1991, entire translation (Year: 1991).*

(Continued)

*Primary Examiner* — Katherine A Christy
(74) *Attorney, Agent, or Firm* — Morse, Barnes-Brown & Pendleton, P.C.; Martin Z. Zhang, Esq.

(57) ABSTRACT

Nickel-plated stainless steel sheets and a method of manufacturing the same are provided. Each of the nickel-plated stainless steel sheets includes a stainless steel base plate and a nickel plating layer formed on at least one surface of the stainless steel base plate by electroplating, in which the nickel plating layer includes a strike plating layer and a main plating layer which are sequentially laminated on the one surface of the stainless steel base plate.

4 Claims, 1 Drawing Sheet

(56) References Cited

FOREIGN PATENT DOCUMENTS

KR    10/2021/0020113 A    2/2021

OTHER PUBLICATIONS

Tadano et al., JP 2004149863 A Google Patents machine translation printed on Sep. 21, 2022, May 27, 2004, entire translation (Year: 2004).*
Izumi et al., JP 2000282290 A machine translation printed on Sep. 22, 2022, Oct. 10, 2000, entire translation (Year: 2000).*
Sugao et al., JP-2003245713-A machine translation printed on Jun. 6, 2023, Sep. 2, 2003, entire translation (Year: 2003).*
Narayanan et al., "Formation and characterization of borohydride reduced electroless nickel deposits", 2004, Journal of Alloys and Compounds 365, URL: <https://core.ac.uk/download/pdf/297710051.pdf>, pp. 197-205 (Year: 2004).*
Parker, "The Formulation of Electroless Nickel-Phosphorus Plating Baths", Apr. 2020, PF Products Finishing: NASF Surface Technology White Papers, URL: <https://www.pfonline.com/cdn/cms/1926_Printable_Version.pdf>, pp. 13-20 (Year: 2020).*
Parkinson, "Properties and applications of electroless nickel", Nickel Development Institute, Feb. 14, 2020, URL: <https://web.archive.org/web/20200214175900/https://www.nickelinstitute.org/media/1769/propertiesandapplicationsofelectrolessnickel_10081_.pdf>, pp. 5 and 6 (Year: 2020).*
Rockwell "Theory of the Rockwell Hardness Test" affri.com/the-rockwell-hardness-test-theory/#thickness, 2022.

\* cited by examiner

NICKEL-PLATED STAINLESS STEEL SHEET HAVING EXCELLENT PROCESSABILITY AND MANUFACTURING METHOD THEREOF

CROSS-REFERENCE TO RELATED APPLICATION

This application claims the benefit of Korean Patent Application No. 10-2021-0064954, filed on May 20, 2021 in the Korean Intellectual Property Office, the entire disclosure of which is incorporated herein by reference.

FIELD OF THE INVENTION

The present invention relates to a nickel-plated stainless steel sheet and a method of manufacturing the same.

DESCRIPTION OF RELATED ART

In general, stainless steel (STS) can be largely divided into austenitic stainless steel (300 series), ferritic stainless steel (400 series), and martensitic stainless steel (400 series). Although there is a difference in degree, stainless steel has an excellent ability to protect a steel plate from external oxidizing materials due to the excellent barrier property of a passivation layer formed in a surface layer and thus is widely used not only as an industrial material requiring corrosion resistance but also for general household items.

However, due to the influence of the strong and robust passivation layer, stainless steel has high surface electrical resistance, and it is difficult to use stainless steel for precision device components requiring constant current or microcurrent control.

Therefore, when coin-type batteries, button-type batteries, and cylindrical batteries including the stainless steel of the present patent are used as primary or secondary batteries, although corrosion resistance is excellent, due to the influence of the above-described robust passivation layer formed on the surface of the stainless steel, surface conductivity is low and thus a battery lifespan is shortened, and since it is difficult to maintain a constant current, it is difficult to use these batteries in precision machines.

Background art related to the present invention is disclosed in Korean Laid-Open Patent Application No. 2021-0020113 (published on Feb. 23, 2021; invention title: Electrolytic Treatment Process for Coating Stainless Steel Objects).

SUMMARY OF THE INVENTION

The present invention is directed to providing a nickel-plated stainless steel sheet having excellent electrical conductivity, oxidation resistance, corrosion resistance, and chemical resistance.

In addition, the present invention is directed to providing a nickel-plated stainless steel sheet having excellent adhesion between a plating material and a steel base plate, excellent surface quality, and mechanical strength.

In addition, the present invention is directed to providing a method of manufacturing the above-described nickel-plated stainless steel sheet.

One aspect of the present invention provides a nickel-plated stainless steel sheet. In one embodiment, the nickel-plated stainless steel sheet includes: a stainless steel base plate; and a nickel (Ni) plating layer formed on at least one surface of the steel base plate by electroplating, wherein the nickel plating layer includes a strike plating layer and a main plating layer which are sequentially laminated on the one surface of the steel base plate.

In one embodiment, the strike plating layer may have a thickness of about 0.05 μm to about 0.5 μm, and the main plating layer may have a thickness of about 0.5 μm to about 4.0 μm.

In one embodiment, the main plating layer may include one or more of a matte plating layer, a semi-bright plating layer, and a bright plating layer.

In one embodiment, the nickel plating layer may include: a strike plating layer; and a first plating layer and a second plating layer as main plating layers, which are sequentially laminated on the one surface of the steel base plate, wherein the first plating layer may be a matte plating layer, and the second plating layer may be a bright plating layer or a semi-bright plating layer, and the first plating layer may have a thickness of about 0.5 μm to about 2.5 μm, and the second plating layer may have a thickness of about 0.3 μm to about 1.5 μm.

Another aspect of the present invention provides a method of manufacturing the above-described nickel-plated stainless steel sheet. In one embodiment, the method of manufacturing the nickel-plated stainless steel sheet includes: removing a passivation layer of a stainless steel base plate; forming a strike plating layer on at least one surface of the steel base plate; and forming a main plating layer on an upper surface of the strike plating layer, wherein the strike plating layer is formed by cathodic strike electroplating using a strike plating solution including nickel chloride and hydrochloric acid, and the main plating layer is formed by cathodic electroplating using a first plating solution including nickel chloride, nickel sulfate, and boric acid.

In one embodiment, the strike plating solution may include nickel chloride hexahydrate ($NiCl_2 \cdot 6H_2O$) at about 50 g/L to about 400 g/L and hydrochloric acid at about 40 cc/L to about 300 cc/L, and the first plating solution may include nickel chloride hexahydrate at about 20 g/L to about 100 g/L, nickel sulfate hexahydrate ($NiSO_4 \cdot 6H_2O$) at about 100 g/L to about 350 g/L, and boric acid at about 20 g/L to about 100 g/L.

In one embodiment, the step of forming a main plating layer may include: forming a first plating layer on the strike plating layer; and forming a second plating layer on the first plating layer, and the first plating layer may be formed by cathodic electroplating using a first plating solution, and the second plating layer may be formed by cathodic electroplating using a second plating solution including nickel sulfate, nickel chloride, boric acid, and a brightener or a semi-brightener.

A nickel-plated stainless steel sheet manufactured according to the present invention can have excellent electrical conductivity, oxidation resistance, corrosion resistance, chemical resistance, adhesion between a plating material and a steel base plate, surface quality, and mechanical strength.

In addition, according to the present invention, a nickel-plated stainless steel sheet having excellent electrical conductivity and nickel plating adhesion can be manufactured, and the nickel-plated stainless steel sheet of the present invention can be suitably used in a precision mechanical device requiring the corrosion resistance of a steel plate itself, long-life battery characteristics, and constant current characteristics, for example, as a shell material for a coin-type battery used in a vehicle tire pressure measuring instrument or a shell material for a small cylindrical battery used in a wireless earphone.

DETAILED DESCRIPTION OF THE INVENTION

In describing the present invention, when it is determined that a detailed description of a related known technology or configuration may unnecessarily obscure the gist of the present invention, the detailed description will be omitted.

In addition, terms described below are defined in consideration of functions in the present invention, and their definitions may vary depending on the intention of a user or operator or customs, so the terms should be defined based on the content throughout the present specification describing the present invention.

Nickel-Plated Stainless Steel Sheet

Figure 1:
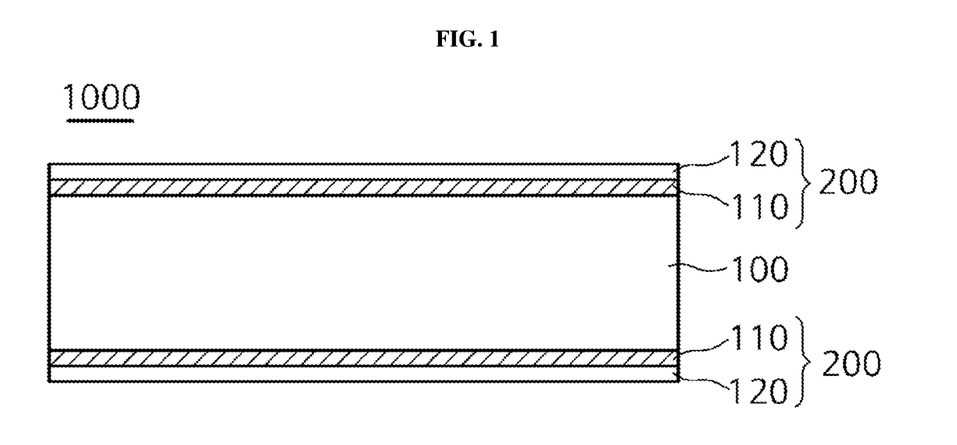
FIG. 1 illustrates a nickel-plated stainless steel sheet according to one embodiment of the present invention.

One aspect of the present invention provides a nickel-plated stainless steel sheet. FIG. 1 illustrates a nickel-plated stainless steel sheet according to one embodiment of the present invention.

Referring to FIG. 1, a nickel-plated stainless steel sheet 1000 includes: a stainless steel base plate 100; and a nickel (Ni) plating layer 200 formed on at least one surface of the steel base plate 100 by electroplating.

In one embodiment, the stainless steel base plate may include a hot-rolled steel plate or a cold-rolled steel plate. For example, the stainless steel base plate may include an austenitic cold-rolled steel plate, a ferritic cold-rolled steel plate, or a martensitic cold-rolled steel plate.

In one embodiment, the stainless steel base plate may include carbon (C), silicon (Si), manganese (Mn), phosphorus (P), sulfur (S), and iron (Fe), and one or more of titanium (Ti), chromium (Cr), molybdenum (Mo), nickel (Ni), and nitrogen (N).

For example, the steel base plate may include, based on its total weight, C at about 0.001 wt % to about 1.5 wt %, Si at more than about 0 wt % and about 2.0 wt % or less, Mn at about 0.1 wt % to about 2.5 wt %, P at more than about 0 wt % and about 0.5 wt % or less, S at more than about 0 wt % and about 0.3 wt % or less, and the remainder being Fe and other inevitable impurities. In addition, the steel base plate may additionally include one or more of Ti, at about 0.01 wt % to about 5.0 wt %, Cr, at about 8 wt % to about 20 wt %, Mo, at about 0.1 wt % to about 5.0 wt %, Ni, at about 5 wt % to about 25 wt %, and N, at about 0.00001 wt % to about 0.05 wt %. When the above components are included in the above-described contents, the desired mechanical properties, such as strength and hardness, of the steel base plate may be ensured.

Carbon (C) may be included at about 0.001 wt % to about 1.5 wt % based on the total weight of the steel base plate. Within the above content range, desired mechanical strength, such as strength and hardness, of the present invention can be attained. For example, Carbon (C) may be included at about 0.001, 0.005, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.55, 0.60, 0.65, 0.70, 0.75, 0.80, 0.85, 0.90, 0.95, 1.0, 1.1, 1.2, 1.3, 1.4, or 1.5 wt %.

Silicon (Si) may be included at more than about 0 wt % and about 2.0 wt % or less based on the total weight of the steel base plate. Within the above content range, the ductility, workability, and high-temperature oxidation resistance of the steel base plate and the like can be excellent. For example, silicon (Si) may be included at about 0.01, 0.05, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 wt %.

Manganese (Mn) may be included at about 0.1 wt % to about 2.5 wt % based on the total weight of the steel base plate. Within the above content range, the strength and hardness of the steel base plate can be easily ensured. For example, Manganese (Mn) may be included at about 0.2 wt % to about 0.5 wt %. For example, Manganese (Mn) may be included at about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4 or 2.5 wt %.

Phosphorus (P) may be included at more than about 0 wt % and about 0.5 wt % or less based on the total weight of the steel base plate. Within the above content range, the occurrence of defects such as segregation in the steel base plate can be prevented, and mechanical strength can be excellent. For example, phosphorus (P) may be included at about 0.001, 0.005, 0.01, 0.05, 0.1, 0.15, 0.2, 0.25, 0.3, 0.35, 0.4, 0.45 or 0.5 wt %.

Sulfur (S), may be included at more than about 0 wt % and about 0.3 wt % or less based on the total weight of the steel base plate. Within the above content range, the occurrence of defects such as segregation in the steel base plate can be prevented, and mechanical strength can be excellent. For example, sulfur (S), may be included at about 0.001, 0.005, 0.01, 0.05, 0.1, 0.15, 0.2, 0.25, or 0.3 wt %.

Titanium (Ti) may be included at about 0.01 wt % to about 5.0 wt % based on the total weight of the steel base plate. Within the above content range, the mechanical properties, such as thermal stability, weldability, and rigidity, and corrosion resistance of the steel base plate can be excellent. For example, titanium (Ti) may be included at about 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.35, 0.40, 0.45, 0.50, 0.60, 0.70, 0.80, 0.90, 1.0, 1.5, 2.0, 2.5, 3.0, 3.5, 4.0, 4.5 or 5.0 wt %.

Chromium (Cr) may be included at about 8 wt % to about 20 wt % based on the total weight of the steel base plate. Within the above content range, the mechanical properties and corrosion resistance of the steel base plate can be excellent. For example, chromium (Cr) may be included at about 8, 9, 10, 11, 12, 13, 14, 15, 16, 17, 18, 19, or 20 wt %.

Molybdenum (Mo) may be included at about 0.1 wt % to about 5.0 wt % based on the total weight of the steel base plate. Within the above content range, the mechanical properties and corrosion resistance of the steel base plate can be excellent. For example, molybdenum (Mo) may be included at about 0.1, 0.2, 0.3, 0.4, 0.5, 0.6, 0.7, 0.8, 0.9, 1.0, 1.5, 2.0, 2.5, 3.0, 3.5, 4.0, 4.5, or 5.0 wt %.

Nickel (Ni) may be included at about 5 wt % to about 25 wt % based on the total weight of the steel base plate. Within the above content range, the mechanical properties and corrosion resistance of the steel base plate can be excellent. For example, nickel (Ni) may be included at about 5, 6, 7, 8, 9, 10, 11, 12, 13, 14, 15, 16, 17, 19, 19, 20, 21, 22, 23, 24, or 25 wt %.

Nitrogen (N) may be included at about 0.00001 wt % to about 0.05 wt % based on the total weight of the steel base plate. Within the above content range, corrosion resistance and mechanical properties can be excellent. For example, nitrogen (N) may be included at about 0.00001, 0.00005, 0.0001, 0.0005, 0.001, 0.005, 0.01, 0.02, 0.03, 0.04, or 0.05 wt %.

Referring to FIG. 1, the nickel plating layer 200 may include a strike plating layer 110 and a main plating layer 120 which are sequentially laminated on one surface of the steel base plate 100.

In one embodiment, the strike plating layer 110 may have a thickness of about 0.05 μm to about 0.5 μm. When the thickness of the strike plating layer is less than about 0.05 μm, a robust passivation layer may remain on a surface of the stainless steel base plate, or a passivation layer may be re-formed on a surface of the steel base plate after strike plating and cause nickel peeling in the subsequent formation of a matte, bright, or semi-bright nickel main plating layer. In addition, when the thickness of the strike plating layer is greater than about 0.5 μm, due to the unnecessarily large amount of nickel strike plating, production costs may be increased, and economic efficiency may be reduced. For example, the thickness of the strike plating layer 110 may be about 0.05, 0.06, 0.07, 0.08, 0.09, 0.1, 0.15, 0.2, 0.25, 0.3, 0.35, 0.4, 0.45, or 0.5 μm.

In one embodiment, the main plating layer 120 may have a thickness of about 0.5 μm to about 4.0 μm. When the thickness of the main plating layer is less than about 0.5 μm, when the final product is used as a battery shell, the electrical conductivity of a surface decreases, making it difficult to sufficiently secure functions of a battery shell, and then the thickness greater than about 4.0 μm, since nickel plating is excessively carried out, workability may be lowered, and production costs may be increased. For example, the thickness of the main plating layer 120 may be about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, or 4.0 μm.

In one embodiment, the main plating layer 120 may include one or more of a matte plating layer, a semi-bright plating layer, and a bright plating layer. For example, for the formation of the main plating layer by electroplating, various plating methods such as (a) matte nickel plating, (b) bright nickel plating, (c) semi-bright nickel plating, (d) matte nickel plating and bright nickel plating, and (e) matte nickel plating and semi-bright nickel plating may be applied depending on conditions and uses. Besides the above-described five types, any plating combination that can be reasonably conceived may be applied.

Figure 2:
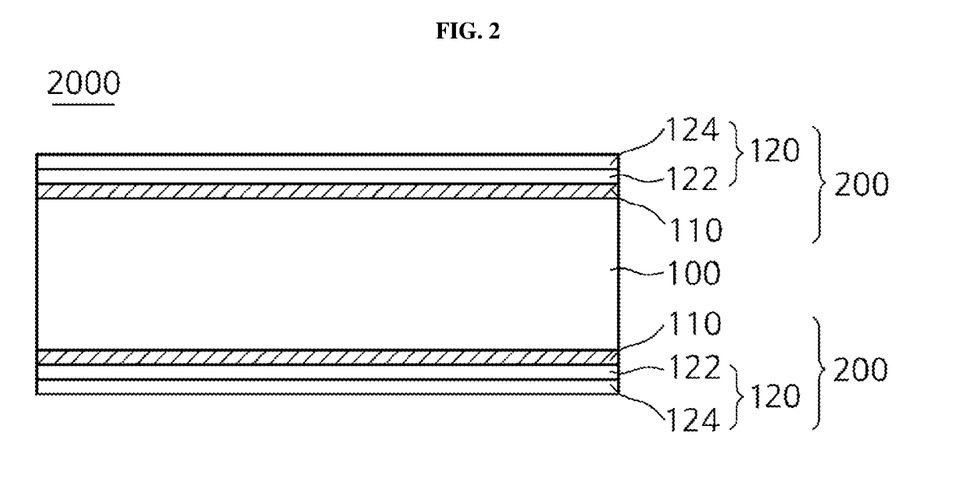
FIG. 2 illustrates a nickel-plated stainless steel sheet according to another embodiment of the present invention.

FIG. 2 illustrates a nickel-plated stainless steel sheet according to another embodiment of the present invention. Referring to FIG. 2, a nickel plating layer 200 may include: a strike plating layer 110; and a first plating layer 122 and a second plating layer 124 as main plating layers 120, which are sequentially laminated on one surface of the steel base plate 100.

In one embodiment, the first plating layer 122 may be a matte plating layer, and the second plating layer 124 may be a bright plating layer or a semi-bright plating layer.

In one embodiment, the first plating layer 122 may have a thickness of about 0.5 μm to about 2.5 μm. When the first plating layer 122 is formed with the above thickness, the adhesion of a nickel plating layer can be excellent, and corrosion resistance, chemical resistance, and electrical conductivity can be excellent. For example, the thickness of the first plating layer 122 may be about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, or 2.5 μm.

In one embodiment, the second plating layer 124 may have a thickness of about 0.3 μm to about 1.5 μm. When the second plating layer 124 is formed with the above thickness, the adhesion of a nickel plating layer can be excellent, and corrosion resistance, chemical resistance, electrical conductivity, and appearance can be excellent. For example, the thickness of the second plating layer 124 may be about 0.3, 0.4, 0.5, 0.6, 0.7, 0.8, 0.9, 1.0, 1.1, 1.2, 1.3, 1.4, or 1.5 μm.

In still another embodiment, the nickel plating layer may include: a strike plating layer; and a first plating layer, a second plating layer, and a third plating layer as main plating layers, which are sequentially laminated on one surface of the steel base plate.

The third plating layer may be a bright plating layer or a semi-bright plating layer. In one embodiment, the third plating layer may have a thickness of about 0.2 μm to about 1.5 μm. When the third plating layer is formed with the above thickness, the adhesion of a nickel plating layer can be excellent, and corrosion resistance, chemical resistance, electrical conductivity, and appearance can be excellent. For example, the thickness of the third plating layer may be about 0.2, 0.3, 0.4, 0.5, 0.6, 0.7, 0.8, 0.9, 1.0, 1.1, 1.2, 1.3, 1.4, or 1.5 μm.

In one embodiment, the main plating layer may include the third plating layer, the second plating layer, and the first plating layer in a thickness ratio of about 1:0.5~3:1.5~4. When the plating layers are formed with the above thickness ratio, surface contact resistance can be minimized, and electrical conductivity, chemical resistance, and appearance can be excellent. For example, the main plating layer may include the third plating layer, the second plating layer, and the first plating layer in a thickness ratio of about 1:1~2:2~3.

In one embodiment, the surface of the main plating layer may have a surface contact resistance of about 7.0 mΩ or less. The surface contact resistance is measured from a surface of the main plating layer using a surface contact resistance measuring instrument (SCR-1R, Dongshin Industries) under the conditions of an alternating current four-terminal method, a measurement current of 50 μA, a 0.5 mΩ gold probe, and a 50 g load. For example, the surface contact resistance may be about 4.5 mΩ to about 6.5 mΩ. For example, the surface contact resistance may be about 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, or 7.0 mΩ.

The nickel-plated stainless steel sheet manufactured according to the present invention can have excellent electrical conductivity, oxidation resistance, corrosion resistance, chemical resistance, adhesion between the plating material and the steel base plate, surface quality, and mechanical strength.

In addition, according to the present invention, a nickel-plated stainless steel sheet having excellent electrical conductivity and excellent nickel plating adhesion can be manufactured, and the nickel-plated stainless steel sheet of the present invention can be suitably used in a precision mechanical device requiring the corrosion resistance of a steel plate itself, long-life battery characteristics, and constant current characteristics, for example, as a shell material for a coin-type battery used in a vehicle tire pressure measuring instrument or a shell material for a small cylindrical battery used in a wireless earphone. For example, the nickel-plated stainless steel sheet of the present invention may be suitable for use as a shell of a primary battery which is discarded after a one-time use and a shell of a secondary battery which can be repeatedly used through charging and discharging.

Method of Manufacturing Nickel-Plated Stainless Steel Sheet

Another aspect of the present invention provides a method of manufacturing the above-described nickel-plated stainless steel sheet. In one embodiment, the method of manufacturing the nickel-plated stainless steel sheet includes: a step S10 of removing a passivation layer; a step S20 of forming a strike plating layer; and a step S30 of forming a main plating layer. More specifically, the method of manufacturing the nickel-plated stainless steel sheet includes: a step S10 of removing a passivation layer of a stainless steel base plate; a step S20 of forming a strike plating layer on at least one surface of the steel base plate; and a step S30 of forming a main plating layer on an upper surface of the strike plating layer.

Step of Removing Passivation Layer (S10)

In this step, a passivation layer of a stainless steel base plate is removed.

In one embodiment, before the step of removing a passivation layer of a steel base plate, a step of pre-treating the steel base plate may be additionally performed. The pre-treatment step may include a degreasing process and a water washing process. The degreasing process may be carried out by a conventional method, and no particular limitation is imposed as long as the method is capable of removing foreign substances such as oil on a surface of the steel base plate, which may act as impurities during nickel plating.

In one embodiment, the removal of the passivation layer may be carried out by exposing the stainless steel base plate to an acidic solution. When the passivation layer is removed, rust that may be formed on a surface of the steel base plate may be removed at the same time as the surface is activated. In the acid washing process, the steel base plate may be immersed in the acidic solution, or electrolytic treatment is preferably applied. The main component of the acidic solution may be hydrochloric acid, nitric acid, sulfuric acid, or the like, and although there is no particular limitation, sulfuric acid is preferably used.

In one embodiment, the passivation layer formed on a surface of the steel base plate may be removed by subjecting the steel base plate to anodic electrolysis or cathodic electrolysis (acid washing) in an about 3 wt % to about 30 wt % aqueous sulfuric acid ($H_2SO_4$) solution. When the electrolytic treatment is carried out using an aqueous sulfuric acid solution satisfying the above-described concentration condition, the passivation layer can be easily removed, and the adhesion of a nickel plating layer and surface electrical resistance characteristics can be excellent.

The electrolytic treatment may be carried out at a current density condition of about 1 $A/dm^2$ to about 20 $A/dm^2$. Under the above condition, rust removal and surface activation can be achieved with excellent efficiency without damaging the steel base plate, the passivation layer can be easily removed, and the adhesion of a nickel plating layer and surface electrical resistance characteristics can be excellent. For example, the electrolytic treatment may be carried out at a current density condition of about 1, 2, 3, 4, 5, 6, 7, 8, 9, 10, 11, 12, 13, 14, 15, 16, 17, 18, 19, or 20 $A/dm^2$.

In one embodiment, the sulfuric acid may have a purity of about 95 wt % or more.

Step of Forming Strike Plating Layer (S20)

In this step, a strike plating layer is formed on at least one surface of the steel base plate. The strike plating layer is formed by carrying out cathodic strike electroplating using a strike plating solution including nickel chloride ($NiCl_2$) and hydrochloric acid (HCl).

When the strike plating layer is formed, a robust passivation layer on a surface of the steel base plate can be destroyed at the same time as the re-formation of the passivation layer is prevented.

In one embodiment, the strike plating solution may include nickel chloride hexahydrate ($NiCl_2.6H_2O$) at about 50 g/L to about 400 g/L and hydrochloric acid at about 40 cc/L to about 300 cc/L.

In one embodiment, the purity of the nickel chloride hexahydrate may be about 95 wt % (wt %) or more, and the purity of the hydrochloric acid may be about 30 wt % to about 35 wt %.

When the strike plating solution includes the nickel chloride hexahydrate at less than about 50 g/L, since nickel plating efficiency is low, it is difficult to control a plating amount, and when the strike plating solution includes the nickel chloride hexahydrate at greater than about 400 g/L, since the concentration is excessively increased, problems such as degradation of working environment, acceleration of equipment corrosion, and an increase in wastewater treatment costs may occur. For example, the strike plating solution may include the nickel chloride hexahydrate at about 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, or 400 g/L.

In addition, when the hydrochloric acid concentration is less than about 40 cc/L, the ability to destroy the robust passivation film of the steel base plate may be insufficient, and a concentration of greater than about 300 cc/L is undesirable because adverse effects such as the degradation of working environment during plating, an increase in equipment corrosion, and an increase in wastewater treatment costs may occur. For example, the strike plating solution may include the hydrochloric acid at about 40, 45, 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, or 300 cc/L.

In one embodiment, the formation of the strike plating layer may be carried out under the conditions of a strike plating solution temperature of about 30° C. to about 50° C. and a current density of about 2 $A/dm^2$ to about 30 $A/dm^2$. When the process is carried out under the above conditions, the adhesion of the strike plating layer and plating quality can be excellent. For example, the cathodic strike electroplating may be carried out under the conditions of a strike plating solution temperature of about 35° C. to about 45° C. and a current density of about 5 $A/dm^2$ to about 12 $A/dm^2$.

The formation of the strike plating solution may be carried out under the conditions of a strike plating solution temperature of about 30, 31, 32, 33, 34, 35, 36, 37, 38, 39, 40, 41, 42, 43, 44, 45, 46, 47, 48, 49, or 50° C. and a current density of about 2, 3, 4, 5, 6, 7, 8, 9, 10, 11, 12, 13, 14, 15, 16, 17, 18, 19, 20, 21, 22, 23, 24, 25, 26, 27, 28, 29, or 30 $A/dm^2$.

In one embodiment, the strike plating layer may be formed with a thickness of about 0.05 μm to about 0.5 μm. When the thickness of the strike plating layer is less than about 0.05 μm, a robust passivation layer may remain on a surface of the stainless steel base plate, or a passivation layer may be re-formed on a surface of the steel base plate after strike plating and cause nickel peeling in the subsequent formation of a matte, bright, or semi-bright nickel main plating layer. In addition, when the thickness of the strike plating layer is greater than about 0.5 μm, due to the unnecessarily large amount of nickel strike plating, production costs may be increased, and economic efficiency may be reduced.

Step of Forming Main Plating Layer (S30)

In this step, a main plating layer is formed on an upper surface of the strike plating layer. The main plating layer is formed by cathodic electroplating using a first plating solution including nickel chloride ($NiCl_2$), nickel sulfate ($NiSO_4$), and boric acid ($H_3BO_3$).

A nickel main plating solution may be configured of a conventional electrolytic nickel plating solution. For example, the nickel main plating solution may be basically a Watt's bath or an acidic plating solution containing an acid such as sulfamate.

For example, the first plating solution may include nickel chloride hexahydrate ($NiCl_2.6H_2O$) at about 20 g/L to about 100 g/L, nickel sulfate hexahydrate ($NiSO_4.6H_2O$) at about 100 g/L to about 350 g/L, and boric acid at about 20 g/L to about 100 g/L.

In one embodiment, each of the nickel chloride hexahydrate, nickel sulfate hexahydrate, and boric acid may have a purity of 95 wt % or more.

The nickel chloride hexahydrate may be included at a concentration of about 20 g/L to about 100 g/L in the first plating solution. When the nickel chloride hexahydrate is included at the above concentration, since the electrical conductivity and plating efficiency of the first plating solution are excellent, the adhesion of the main plating layer and plating quality can be excellent. For example, the first plating solution may include the nickel chloride hexahydrate at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

The nickel sulfate hexahydrate may be included at a concentration of about 100 g/L to about 350 g/L in the first plating solution. When the nickel sulfate hexahydrate is included at the above concentration, the effect of supplying nickel ions can be excellent, and the adhesion of the main plating layer and plating quality can be excellent. For example, the first plating solution may include the nickel sulfate hexahydrate at a concentration of about 100, 110, 120, 130, 140, 150, 160, 170, 180, 190, 200, 210, 220, 230, 240, 250, 260, 270, 280, 290, 300, 310, 320, 330, 340, or 350 g/L.

The boric acid may be included at a concentration of about 20 g/L to about 100 g/L in the first plating solution. When the boric acid is included at the above concentration, the pH change of the first plating solution can be minimized, and thus nickel plating efficiency and plating quality can be excellent. For example, the first plating solution may include the boric acid at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

In one embodiment, the main plating layer may be formed under the conditions of a first plating solution temperature of about 40° C. to about 70° C. and a current density of about 3 $A/dm^2$ to about 40 $A/dm^2$. Under the above conditions, electrical conductivity and plating efficiency can be excellent, and the adhesion of the main plating layer and plating quality can be excellent. For example, the main plating layer may be formed under the conditions of a first plating solution temperature of about 40° C. to about 55° C. and a current density of about 5 $A/dm^2$ to about 10 $A/dm^2$.

In one embodiment, the first plating solution may have a pH condition of about 3.0 to about 4.8. Under the above condition, the adhesion of the main plating layer and plating quality can be excellent. For example, the pH of the first plating solution may be about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, or 4.8.

In one embodiment, the step of forming the plating layer may include: forming a first plating layer on the strike plating layer; and forming a second plating layer on the first plating layer.

In one embodiment, the first plating layer may be a matte plating layer, and the second plating layer may be a bright plating layer or a semi-bright plating layer.

In one embodiment, the first plating layer may be formed by cathodic electroplating using the first plating solution.

In one embodiment, the first plating layer may be formed by cathodic electroplating using the first plating solution including nickel chloride hexahydrate at about 20 g/L to about 100 g/L, nickel sulfate hexahydrate at about 150 g/L to about 350 g/L, and boric acid at about 20 g/L to about 100 g/L. When the first plating solution is used, a matte plating layer can be easily formed, and the adhesion of the first plating layer and plating quality can be excellent.

For example, the first plating solution may include the nickel chloride hexahydrate at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

For example, the first plating solution may include the nickel sulfate hexahydrate at about 150, 160, 170, 180, 190, 200, 210, 220, 230, 240, 250, 260, 270, 280, 290, 300, 310, 320, 330, 340, or 350 g/L.

For example, the first plating solution may include the boric acid at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

The first plating layer may be formed under the conditions of a pH of about 3.0 to about 4.8, a first plating solution temperature of about 40° C. to about 70° C., and a current density of about 3 $A/dm^2$ to about 40 $A/dm^2$. Under the above conditions, the adhesion of the first plating layer and plating quality can be excellent.

The first plating layer may be formed under the conditions of a first plating solution temperature of about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70° C. and a current density of about 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 $A/dm^2$.

In one embodiment, the first plating layer may be formed with a thickness of about 0.5 µm to about 2.5 µm. When the first plating layer is formed with the above thickness, the adhesion of the nickel plating layer can be excellent, and corrosion resistance, chemical resistance, and electrical conductivity can be excellent.

In one embodiment, the second plating layer may be formed by cathodic electroplating using a second plating solution including nickel sulfate, nickel chloride, boric acid, and a brightener or a semi-brightener.

The brightener and the semi-brightener may include, without limitation, any brightener and semi-brightener commonly used in the art.

For example, the brightener may include one or more of a sulfonate of a saturated or unsaturated aliphatic compound, a sulfonate of an aromatic compound, an inorganic compound (e.g., sodium 1,5-naphthalenedisulfonate, butynediol, sodium 1,3,6-naphthalenedisulfonate, o-benzenesulfonimide, and cobalt sulfate), an organic compound having an unsaturated group (e.g., ethylene cyanohydrin, gelatin, coumarin, and nickel formate), and a metal (e.g., cadmium, zinc, sulfur, and selenium) compound, but the present invention is not limited thereto.

For example, the semi-brightener may include one or more of a polyoxyethylene adduct of unsaturated alcohol, unsaturated carboxylic acid formaldehyde, chloral hydrate, formalin, coumarin, an unsaturated carboxylic acid, and 1,4-butynediol, but the present invention is not limited thereto.

In one embodiment, the second plating layer may be formed by cathodic electroplating using a second plating solution.

For example, the second plating solution may include nickel chloride hexahydrate ($NiCl_2.6H_2O$) at about 20 g/L to about 100 g/L, nickel sulfate hexahydrate ($NiSO_4.6H_2O$) at about 100 g/L to about 350 g/L, boric acid at about 20 g/L to about 100 g/L, and a brightener or a semi-brightener at about 0.001 g/L to about 30 g/L. When the components are included at the above concentrations, the effect of supplying nickel ions can be excellent, the adhesion of the second plating layer and plating quality can be excellent, and a second plating layer having semi-bright or bright characteristics can be easily formed.

For example, the second plating solution may include the nickel chloride hexahydrate at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

For example, the second plating solution may include the nickel sulfate hexahydrate at a concentration of about 100, 110, 120, 130, 140, 150, 160, 170, 180, 190, 200, 210, 220, 230, 240, 250, 260, 270, 280, 290, 300, 310, 320, 330, 340, or 350 g/L.

For example, the second plating solution may include the boric acid at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

For example, the second plating solution may include the brightener or semi-brightener at a concentration of about 0.001, 0.002, 0.003, 0.004, 0.005, 0.006, 0.007, 0.008, 0.009, 0.01, 0.05, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 g/L.

In one embodiment, the second plating layer may be formed by cathodic electroplating using the second plating solution.

In one embodiment, the second plating layer may be formed under the conditions of a pH of about 3.0 to about 4.8, a second plating solution temperature of about 40° C. to about 50° C., and a current density of about 5 A/dm² to about 20 A/dm². Under the above conditions, the adhesion of the second plating layer and plating quality can be excellent. For example, the second plating layer may be formed under the conditions of a second plating solution of about 40, 41, 42, 43, 44, 45, 46, 47, 48, 49, or 50° C. and a current density of about 5, 6, 7, 8, 9, 10, 11, 12, 13, 14, 15, 16, 17, 18, 19, or 20 A/dm². For example, in the formation of the second plating layer, the second plating solution may have a pH condition of about 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, or 4.8.

In one embodiment, the second plating layer may be formed with a thickness of about 0.3 μm to about 1.5 μm. When the second plating layer is formed with the above thickness, the adhesion of the nickel plating layer can be excellent, and corrosion resistance, chemical resistance, electrical conductivity, and appearance can be excellent.

In one embodiment, each of the first plating solution and the second plating solution may include an additive.

In one embodiment, the additive may include one or more of a leveling agent, a pinhole preventing agent, a stabilizer, a pH adjusting agent, a conductive salt, a preservative, and an antifoaming agent, but the present invention is not limited thereto.

In another embodiment, the step of forming a plating layer may additionally include, after the step of forming a second plating layer on a first plating layer, a step of forming a third plating layer on the second plating layer.

In one embodiment, the third plating layer may be formed by cathodic electroplating using a third plating solution.

The third plating layer may be a bright plating layer or a semi-bright plating layer.

For example, the third plating solution may include nickel chloride hexahydrate ($NiCl_2.6H_2O$) at about 20 g/L to about 100 g/L, nickel sulfate hexahydrate ($NiSO_4.6H_2O$) at about 100 g/L to about 350 g/L, boric acid at about 20 g/L to about 100 g/L, and a brightener or a semi-brightener at about 0.001 g/L to about 30 g/L. When the components are contained at the above concentrations, the effect of supplying nickel ions can be excellent, the adhesion of the third plating layer and plating quality can be excellent, and a third plating layer having semi-bright or bright characteristics can be easily formed.

For example, the third plating solution may include the nickel chloride hexahydrate at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

For example, the third plating solution may include the nickel sulfate hexahydrate at a concentration of about 100, 110, 120, 130, 140, 150, 160, 170, 180, 190, 200, 210, 220, 230, 240, 250, 260, 270, 280, 290, 300, 310, 320, 330, 340, or 350 g/L.

For example, the third plating solution may include the boric acid at a concentration of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 g/L.

For example, the third plating solution may include the brightener or semi-brightener at a concentration of about 0.001, 0.002, 0.003, 0.004, 0.005, 0.006, 0.007, 0.008, 0.009, 0.01, 0.05, 0.1, 0.5, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 g/L.

The same components as those of the second plating solution may be used in the third plating solution, and the third plating layer may be formed under the same conditions.

In one embodiment, the third plating layer may be formed with a thickness of about 0.2 μm to about 1.5 μm. When the third plating layer is formed with the above thickness, the adhesion of the nickel plating layer can be excellent, and corrosion resistance, chemical resistance, electrical conductivity, and appearance can be excellent.

In one embodiment, the main plating layer may include the third plating layer, the second plating layer, and the first plating layer in a thickness ratio of about 1:0.5~3:1.5~4. When the plating layers are formed with the above thickness ratio, surface contact resistance can be minimized, and electrical conductivity, chemical resistance, and appearance can be excellent. For example, the main plating layer may include the third plating layer, the second plating layer, and the first plating layer in a thickness ratio of about 1:1~2:2~3.

Hereinafter, the configuration and operation of the present invention will be described in more detail through exemplary embodiments of the present invention. However, the exemplary embodiments are only illustrative of the present invention and should not be construed as limiting the present invention in any way. Contents not described herein can be technically easily inferred by those skilled in the art, and thus descriptions thereof will be omitted.

EXAMPLES AND COMPARATIVE EXAMPLES

Example 1

(1) Preparation of stainless steel base plate: A cold-rolled stainless steel base plate (STS430) having a thickness of 0.2 mm was used.

(2) Removal of passivation layer: The steel base plate was subjected to alkaline electrolytic degreasing and water washing to remove impurities on a surface thereof, and subjected to anodic electrolysis (acid washing) in a 5 wt % aqueous sulfuric acid ($H_2SO_4$) solution at a current density condition of 5 A/dm² to remove a passivation layer, remove rust, and activate the surface.

(3) Formation of nickel plating layer: Nickel plating was performed on one surface of the steel base plate. Specifically, a strike plating solution and a main plating solution under the conditions shown in Table 1 below were provided. The used semi-brighteners and brighteners shown in Table 1 below are semi-brighteners and brighteners conventionally used in the art. Subsequently, cathodic strike electroplating and cathodic electroplating using a first plating solution were carried out under the conditions shown in Table 1 below to form a strike plating layer and a first plating layer on one side of the steel base plate, and thus a nickel-plated stainless steel plate was obtained. The order of formation of the nickel plating layers of Example 1, the thicknesses of strike plating layers, and the thicknesses of main plating layers are shown in Table 2 below.

Examples 2 to 15

Nickel-plated stainless steel plates were manufactured in the same manner as in the above-described Example 1 except that the main plating solutions shown in Table 1 below and the conditions for forming a nickel plating layer shown in Table 2 below were applied.

Example 16

A nickel-plated stainless steel plate was manufactured in the same manner as in the above-described Example 1 except that nickel plating layers were formed on both surfaces of the steel base plate under the conditions shown in Table 2 below.

Comparative Example 1

The same steel base plate (STS 430) as in Example 1 was provided, but only impurities on the surface were removed by alkaline electrolytic degreasing and water washing.

Comparative Example 2

A nickel-plated stainless steel plate was manufactured in the same manner as in the above-described Example 1 except that nickel strike plating was not performed.

Property Evaluation (1) Nickel plating layer peeling test: An impact test method was performed on specimens prepared in Examples and Comparative Examples to test whether a nickel plating layer was peeled off. Specifically, the test was carried out using an impact tester (DuPont-type impact tester manufactured by CG TOYOSEIKY) under the conditions of an impact load of 500 g and an impact height of 0.5 m. The area where plastic deformation (projection) had occurred due to impact was examined with the naked eye or an optical microscope to determine whether a nickel plating layer was peeled off, and the results, which were evaluated as good or peeled, are shown in Table 2 below.

(2) Nickel plating layer surface contact resistance (me): The surface contact resistance of specimens prepared in Examples and Comparative Examples was evaluated by measuring the electrical conductivity of a main plating layer. Specifically, the measurement was carried out using a surface contact resistance tester (SCR-1R, Dongshin Industries) under the conditions of an alternating current four-terminal method, a measurement current of 50 μA, a 0.5 mmφ gold probe, and a 50 g load, and the results are shown in Table 2 below.

TABLE 1

| | | Ni main plating solution | | |
| --- | --- | --- | --- | --- |
| Chemicals | Ni strike plating solution | First plating solution (matte) | Second plating solution (semi-bright) | Third plating solution (bright) |
| HCl (cc/L) | 80 | — | — | — |
| $NiCl_2 \cdot 6H_2O$ (g/L) | 200 | 45 | 45 | 45 |
| $NiSO_4 \cdot 6H_2O$ (g/L) | — | 250 | 250 | 250 |
| $H_3BO_3$ (g/L) | — | 45 | 45 | 45 |
| Semi-brightener | — | — | Adequate amount | — |
| Brightener | — | — | — | Adequate amount |

TABLE 1-continued

|  | Ni strike plating solution | Ni main plating solution | | |
|---|---|---|---|---|
| Chemicals |  | First plating solution (matte) | Second plating solution (semi-bright) | Third plating solution (bright) |
| Temperature (° C.) | 40 | 55 | 40 | 40 |
| Current density (A/dm²) | 10 | 10 | 5 | 5 |

TABLE 2

| Classification | | Strike plating layer thickness (μm) ① | Main plating layer thickness (μm) | | | | Nickel layer peeling test | Surface contact resistance (mΩ) | Order of plating layer formation |
|---|---|---|---|---|---|---|---|---|---|
| | | | Matte ② | Semi-bright ③ | Bright ④ | Total | | | |
| One surface | Comparative Example1 | — | — | — | — | — | — | 10.1 | No plating |
| | Comparative Example2 | 0 | 1.5 | — | — | 1.5 | Peeled | 9.9 | ② |
| | Example1 | 0.1 | 1.5 | — | — | 1.5 | Good | 6 | ①-② |
| | Example2 | 0.1 | — | 1.5 | — | 1.5 | Good | 6.2 | ①-③ |
| | Example3 | 0.1 | — | — | 1.5 | 1.5 | Good | 6.4 | ①-④ |
| | Example4 | 0.1 | 1.5 | 0.5 | — | 2.0 | Good | 5.5 | ①-②-③ |
| | Example5 | 0.1 | 1.5 | — | 0.5 | 2.0 | Good | 5.9 | ①-②-④ |
| | Example6 | 0.3 | 1.5 | — | — | 1.5 | Good | 6.4 | ①-② |
| | Example7 | 0.3 | — | 1.5 | — | 1.5 | Good | 6.3 | ①-③ |
| | Example8 | 0.3 | — | — | 1.5 | 1.5 | Good | 6.4 | ①-④ |
| | Example9 | 0.3 | 1.5 | 0.5 | — | 2.0 | Good | 5.7 | ①-②-③ |
| | Example10 | 0.3 | 1.5 | — | 0.5 | 2.0 | Good | 5.6 | ①-②-④ |
| | Example11 | 0.5 | 1.5 | — | — | 1.5 | Good | 6.0 | ①-② |
| | Example12 | 0.5 | — | 1.5 | — | 1.5 | Good | 6.2 | ①-③ |
| | Example13 | 0.5 | — | — | 1.5 | 1.5 | Good | 6.1 | ①-④ |
| | Example14 | 0.5 | 1.5 | 0.5 | — | 2.0 | Good | 5.7 | ①-②-③ |
| | Example15 | 0.5 | 1.5 | — | 0.5 | 2.0 | Good | 5.7 | ①-②-④ |
| Both surfaces | Example16 | 0.3 each | 1.0 each | 0.5 each | 0.5 each | 2.0 each | Good | 5.5 | ①-②-③-④ |

Referring to the above Table 2, the above-described Comparative Example 1, in which a steel base plate was not subjected to nickel plating treatment, was intended for comparing surface resistance with Examples 1 to 16 in which a nickel plating layer was formed. Referring to the above Table 2, from the surface contact resistance measurement results for Examples 1 to 16, it can be seen that Comparative Example 1 in which a nickel plating layer was not formed had a surface contact resistance of about 1.6 times higher than that of Example 1. That is, the formation of a nickel plating layer on a steel base plate can reduce surface contact resistance, and consequently, when a nickel-plated stainless steel sheet of the present invention is used as a battery shell, not only can the lifespan of the battery be extended, but also a more stable output current (constant current) can be expected.

Referring to the above Table 2, in the case of Comparative Example 2 in which a nickel strike plating layer of the present invention was not used, it can be seen that since a passivation layer was re-formed on a part of a surface of the steel base plate after the formation of a strike plating layer, the adhesion with a nickel main plating layer was degraded, and therefore, the peeling of a nickel plating layer occurred.

In the case of Examples 1 to 16 in which a nickel plating layer was formed according to the present invention, the peeling of a nickel plating layer was not observed at all, and surface contact resistance was only about 60% of that of Comparative Example 1. Therefore, when a nickel-plated stainless steel sheet product of the present invention is used as a battery shell which is a main target product, it can be expected to achieve an extended battery lifespan and a more stable output current (constant current).

In the above, the present invention has been described through exemplary embodiments. However, those of ordinary skill in the art to which the present invention pertains will understand that the present invention can be implemented in modified forms without departing from the essential characteristics of the present invention. Therefore, the disclosed exemplary embodiments are to be construed as illustrative rather than restrictive. The scope of the present invention is indicated in the claims rather than the foregoing description, and all differences within equivalents of the scope are to be construed as being included in the present invention.

What is claimed is:

1. A nickel-plated stainless steel plate, comprising:
a stainless steel base plate; and
a nickel (Ni) plating layer formed on at least one surface of the stainless steel base plate by electroplating, wherein the stainless steel base plate contains, based on its total weight, C at about 0.001 wt % to about 1.5 wt %, Si at more than 0 wt % to about 2.0 wt %, Mn at about 0.1 wt % to about 2.5 wt %, P at more than 0 wt % to about 0.5 wt %, S at more than 0 wt % to about 0.3 wt %, Cr at about 8 wt % to about 20 wt %, and the remainder being Fe and inevitable impurities, and the nickel (Ni) plating layer includes a strike plating layer and a main plating layer containing a first plating layer and a second plating layer, in which
(i) the strike plating layer, the first plating layer, and the second plating layer are sequentially laminated on the one surface of the stainless steel base plate;
(ii) the strike plating layer has a thickness of about 0.3 μm to about 0.5 μm;
(iii) the first plating layer, having a thickness of about 0.5 μm to about 2.5 is both an electrolytic nickel plating layer and a matte plating layer; and
(iv) the second plating layer, having a thickness of about 0.3 μm to about 1.5 is both an electrolytic nickel plating layer and a semi-bright plating layer.

2. The nickel-plated stainless steel plate of claim 1, wherein the main plating layer has a thickness of about 0.8 μm to about 4.0 μm.

3. The nickel-plated stainless steel plate of claim 2, wherein the main plating layer includes a bright plating layer.

4. A nickel-plated stainless steel plate comprising a stainless steel base plate and a nickel (Ni) plating layer formed on at least one surface of the stainless steel base plate by electroplating, wherein
the nickel (Ni) plating layer includes a strike plating layer having a thickness of about 0.3 μm to about 0.5 μm, and a main plating layer containing a first plating layer and a second plating layer, the strike plating layer, the first plating layer, and the second plating layer are sequentially laminated on the one surface of the stainless steel base plate, the first plating layer, having a thickness of about 0.5 μm to about 2.5 μm, is both an electrolytic nickel plating layer and a matte plating layer, the second plating layer, having a thickness of about 0.3 μm to about 1.5 μm, is both an electrolytic nickel plating layer and a bright plating layer or a semi-bright plating layer, and the stainless steel base plate contains, based on its total weight, C at about 0.001 wt % to about 1.5 wt %, Si at more than 0 wt % to about 2.0 wt %, Mn at about 0.1 wt % to about 2.5 wt %, P at more than 0 wt % to about 0.5 wt %, S at more than 0 wt % to about 0.3 wt %, Cr at about 8 wt % to about 20 wt %, and the remainder being Fe and inevitable impurities.

* * * * *